(12) United States Patent
Charles

(10) Patent No.: US 10,110,158 B1
(45) Date of Patent: Oct. 23, 2018

(54) TEMPERATURE COMPENSATION FOR DC MOTOR PWM APPLICATIONS

(71) Applicant: Siemens Schweiz AG, Zurich (CH)

(72) Inventor: Donald E. Charles, Wauconda, IL (US)

(73) Assignee: Siemens Schweiz AG, Zurich (CH)

( * ) Notice: Subject to any disclaimer, the term of this patent is extended or adjusted under 35 U.S.C. 154(b) by 0 days.

(21) Appl. No.: 15/720,388

(22) Filed: Sep. 29, 2017

(51) Int. Cl.
*G05D 23/00* (2006.01)
*H02P 29/68* (2016.01)
*G01K 7/42* (2006.01)
*H02P 7/29* (2016.01)

(52) U.S. Cl.
CPC .............. *H02P 29/68* (2016.02); *G01K 7/42* (2013.01); *H02P 7/29* (2013.01)

(58) Field of Classification Search
CPC ...... H02P 1/00; H02P 3/00; H02P 6/00; H02P 41/00; H02P 27/04; H02P 27/06; H02P 1/46; H02P 3/18; H02P 21/00; H02P 23/00; H02P 27/00; G05B 5/00; G05D 23/00; H02H 7/08
USPC .......... 318/471, 472, 599, 400.01, 700, 701, 318/727, 779, 799, 800, 801, 430, 437; 361/23, 30, 24, 25, 27, 37, 57, 93.8, 221
See application file for complete search history.

(56) References Cited

U.S. PATENT DOCUMENTS

2005/0018371 A1\* 1/2005 Mladenik ................. H02H 3/00
361/78
2018/0062523 A1\* 3/2018 Rainer .............. H02M 3/33507

\* cited by examiner

*Primary Examiner* — Antony M Paul

(57) ABSTRACT

Motor control systems and methods. A motor control system includes a temperature compensated power supply configured to receive a supply voltage and output a temperature compensated reference voltage. The reference voltage varies according to an ambient temperature of the motor control system. The motor control system includes a microcontroller configured to receive the temperature compensated reference voltage and a sensed motor current and to produce a corresponding pulse-width-modulated (PWM) motor control signal. The microcontroller is configured to increase a duty cycle of the PWM motor control signal as a function of the temperature compensated reference voltage. The motor control system includes a motor configured to be controlled according to the duty cycle of the motor control signal.

10 Claims, 3 Drawing Sheets

TEMPERATURE COMPENSATION FOR DC MOTOR PWM APPLICATIONS

TECHNICAL FIELD

The present disclosure is directed, in general, to motor control systems, devices, and methods.

BACKGROUND OF THE DISCLOSURE

It can be important to correctly control motor operations even in increased or extreme temperature conditions to compensate for motor torque reduction at extreme temperatures.

SUMMARY OF THE DISCLOSURE

Various disclosed embodiments include motor control systems and methods. A motor control system includes a temperature compensated power supply configured to receive a supply voltage and output a temperature compensated reference voltage. The reference voltage varies according to an ambient temperature of the motor control system. The motor control system includes a microcontroller configured to receive the temperature compensated reference voltage and a sensed motor current and to produce a corresponding pulse-width-modulated (PWM) motor control signal. The microcontroller is configured to increase a duty cycle of the PWM motor control signal as a function of the temperature compensated reference voltage. The motor control system includes a motor configured to be controlled according to the duty cycle of the motor control signal.

In various embodiments, the sensed motor current determines the PWM. This technique effectively temperature compensates the sensed current by changing the reference voltage of an analog-to-digital convertor.

In specific embodiments, the temperature compensated power supply includes a resistor and a Zener diode connected between the supply voltage Vs and a ground, wherein a cathode of Zener diode is connected to the resistor. The temperature compensated power supply also includes an NPN transistor, wherein a collector of the NPN transistor is connected to the supply voltage and an emitter of the NPN transistor is connected to produce the control voltage. The temperature compensated power supply also includes a diode, wherein a cathode of the diode is connected to a base of the NPN transistor and an anode of the diode is connected to the connection between the cathode of the Zener diode and the resistor. The circuit may be described as an emitter follower in that the output is taken from the emitter, and the emitter follows the reference voltage created by the Zener diode and the additional diode.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
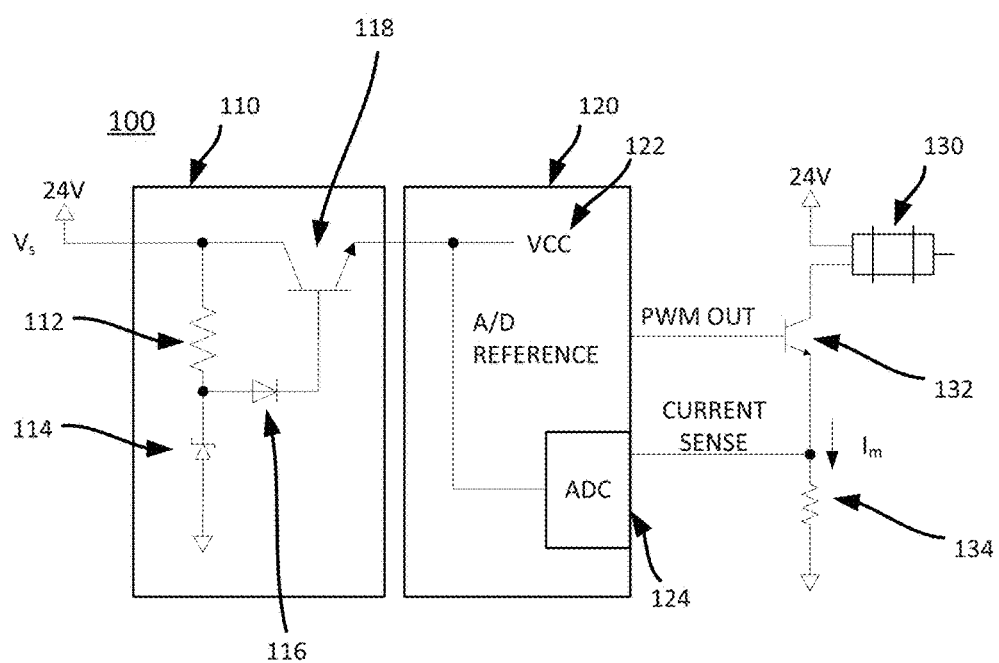
FIG. 1 illustrates a motor-control system in accordance with disclosed embodiments.
Figure 2:
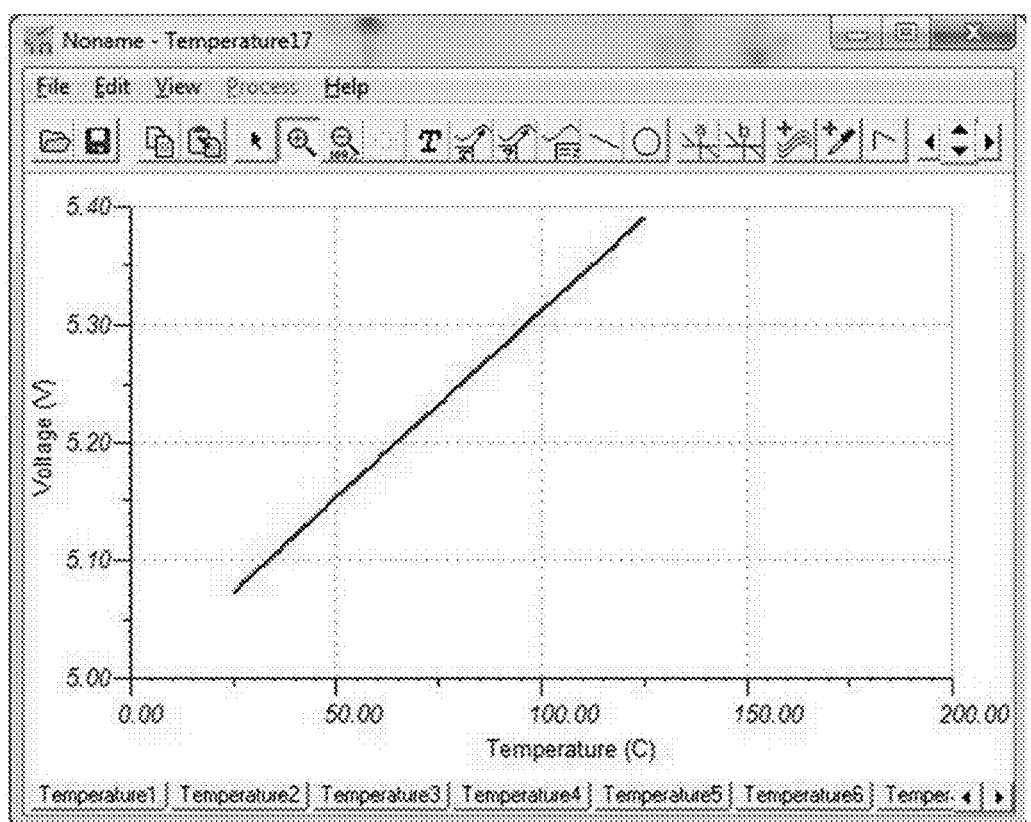
FIG. 2 illustrates a simulation of a temperature compensated power supply in accordance with disclosed embodiments.
Figure 3:
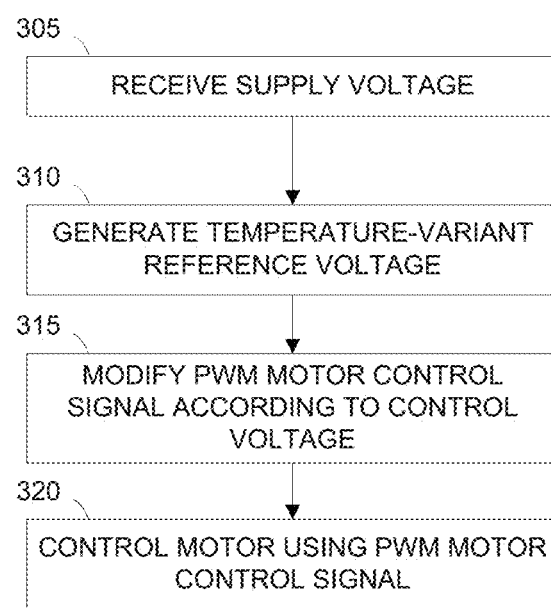
FIG. 3 illustrates a flowchart of a process in accordance with disclosed embodiments.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

In certain smoke control applications, it is necessary for the actuator to meet certain UL requirements. These requirements call for the actuator to operate at an extended temperature of 250° F. for up to 45 minutes as an initial qualification test. This test is not performed on every unit.

One actuator design employs a DC brush with pulse width modulation (PWM) control provided by a microcontroller.

The torque of a DC brush motor decreases substantially at elevated temperatures. This implies that the motor current, or PWM duty cycle, needs to increase as temperature rises to provide adequate torque. Another function of the PWM control is to sense the increased motor current once the actuator reaches the end stop, and reduce the motor current to minimize stress on the gear train. The PWM duty cycle will be reduced to a level that provides enough motor current so the actuator is held in the open position. Due to the motor torque reduction at high temperature this hold current must increase above the level used at normal temperatures.

Disclosed embodiments include alternate ways of adding temperature sensors to a design. For example, a sensing element can supply a signal to an analog-to-digital converter (ADC). The microcontroller can then calculate the required change needed to the PWM duty cycle. This such a solution, however, requires extra hardware components and additional software overhead in the microcontroller. This circuitry would also need to operate at 250° F., which may be difficult or expensive to achieve.

Another approach is to operate the motor at higher currents at normal operating temperatures. This approach, however, will degrade the motor and gear train, reducing actuator life.

Disclosed embodiments include low cost, simple approach to adjusting the motor current as a function of temperature. This allows the motor to operate at low currents under normal operation, thereby extending actuator life, with automatic adjustment under increased temperatures.

FIG. 1 illustrates a motor-control system 100 in accordance with disclosed embodiments. In this example, temperature-compensated power supply 110 provides a reference voltage 122 (VCC) to a microcontroller 120. Reference voltage 122 also is used as a reference voltage to ADC 124. Microcontroller 120 controls motor 130. Microcontroller 120 can be can be implemented as any controller, ASIC, or other control circuitry.

According this embodiment, microcontroller 120 is used to pulse width modulate the voltage to a DC brush motor 130 at the PWM OUT connection to transistor 132. The speed and torque of motor 130 is varied according to the voltage and duty cycle of the PWM OUT pulse signal controlling transistor 132. Control voltage 122 therefore determines the "volts per count" of the A/D and the PWM OUT signal.

The motor current $I_m$ is sensed by the voltage drop across current sense resistor 134, and fed back to an ADC 124, which can be internal or external to the microcontroller 120, so the motor speed and torque can be controlled by the microcontroller 120 by varying the duty cycle of motor control signal PWM OUT based on a control algorithm of microcontroller 120. The voltage across 134 is read by the A/D. The pulse width of motor control signal PWM OUT varies according to the sensed motor current (Voltage drop across resistor 134), and the A/D reference voltage 122. When the motor reaches its end of travel, a voltage across resistor 134, corresponding to a high motor current $I_m$ is sensed and the pulse width is decreased to a "hold current" to prevent damage to the gear train.

The temperature compensated power supply 110 varies the reference voltage 122 according to the temperature by using the temperature coefficients of Zener diode 114, the base-emitter (BE) junction of transistor 118, and diode 116. As the temperature increases, these effects produce a higher voltage at the emitter of NPN transistor 118 (reference voltage 122).

In the temperature compensated power supply 110, a resistor 112 and Zener diode 114 are connected between a supply voltage $V_s$ (in this example 24V) and a ground. The cathode of Zener diode 114 is connected to the resistor 112. Temperature compensated power supply 110 includes an NPN transistor 118 with its collector connected to the supply voltage $V_s$ and its emitter connected to provide reference voltage 122 to microcontroller 120. The base of NPN transistor 118 is connected to be controlled by the cathode of diode 116. The anode of diode 116 is connected to the cathode of Zener diode 114 and resistor 112. The temperature coefficients of 114, 116, and 118 sum to produce the temperature-compensated power supply at reference voltage 122.

Disclosed embodiments address issues of motor control under increased temperatures by adjusting the ADC reference voltage 122. Disclosed embodiments exploit the temperature coefficient of the Zener diode 114, the BE junction of a bipolar junction NPN transistor 115, and an additional silicon diode 116 to provide a power supply control voltage 122. The ADC 124 samples the current sense voltage generated by current $I_m$ across transistor 134 and converts it to a digital feedback signal for use by the microcontroller. The ADC reference voltage determines the volts for each A/D count. The motor control algorithm then controls the pulse width of the motor control signal PWM OUT.

As the reference voltage control voltage 122 increases, the volts per count of the ADC 124 increases, hence the motor current increases based on the same PWM control algorithm count values. The microcontroller 120 is configured to adjust the motor current $I_m$ according to the counts measured in the digital feedback signal. Using this technique, there is no need for any modifications to the microcontroller programming to account for temperature increases. The increased motor current at high temperature is a result of the ADC reference voltage 122 increasing as temperature increases.

Such an embodiment avoids the need for such components as a temperature sensing element, conditioning circuitry, ADC readings, and software overhead.

FIG. 2 illustrates a simulation of temperature compensated power supply 110, showing that the power supply control voltage 122, shown on the Y axis, increases as the temperature increases, as shown on the X axis.

FIG. 3 depicts a flowchart of a process in accordance with disclosed embodiments that may be performed, for example, by a motor control system as disclosed herein.

The motor control system receives a supply voltage by a temperature compensated power supply (305). This can be the supply voltage $V_s$ (in this example 24V).

The motor control system generates an A/D reference voltage from the supply voltage by the temperature compensated power supply (310). The reference voltage directly varies with the ambient temperature of the motor control system.

The motor control system modifies a pulse-width-modulated motor control signal using a microcontroller according to the reference voltage (315). The temperature-compensated reference voltage effectively changes the "gain" or scaling of the ADC as described herein.

The motor control system controls a motor using a pulse-width-modulated motor control signal by a microcontroller (320). The pulse-width of the modulated signal directly varies with the A/D reference voltage and the sensed motor current (according to the voltage drop across resistor 134). The microcontroller receives the A/D reference voltage from the temperature compensated power supply.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all circuits or devices suitable for use with the present disclosure is not being depicted or described herein. Instead, only so much of a circuit as is unique to the present disclosure or necessary for an understanding of the present disclosure is depicted and described. The remainder of the construction and operation of motor control system 100 may conform to any of the various current implementations and practices known in the art. Note that the specific logical divisions described herein between the power supply, the microcontroller, and other elements is exemplary and not intended to be limiting. The various elements and components can be grouped, associated, or separated as may be useful so long as the claimed interrelations and operations are satisfied.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle. The use of terms such as (but not limited to) "mechanism," "module," "device," "unit," "component," "element," "member," "apparatus," "machine," "system," "processor," or "controller," within a claim is understood and intended to refer to structures known to those skilled in the relevant art, as further modified or enhanced by the features of the claims themselves, and is not intended to invoke 35 U.S.C. § 112(f).

What is claimed is:

1. A motor control system comprising:
    temperature compensated power supply configured to receive a supply voltage and output a temperature compensated reference voltage, wherein the reference voltage varies according to an ambient temperature of the motor control system;
    a microcontroller configured to receive the temperature compensated reference voltage and a sensed motor current and to produce a corresponding pulse-width-modulated (PWM) motor control signal, wherein the microcontroller is configured to increase a duty cycle of the PWM motor control signal as a function of the temperature compensated reference voltage; and
    a motor configured to be controlled according to the duty cycle of the motor control signal.

2. The motor control system of claim 1, wherein the temperature compensated power supply comprises:
    a resistor and a Zener diode connected between the supply voltage and a ground, wherein a cathode of Zener diode is connected to the resistor;
    an NPN transistor, wherein a collector of the NPN transistor is connected to the supply voltage and an emitter of the NPN transistor is connected to produce the temperature compensated reference voltage; and
    a diode, wherein a cathode of the diode is connected to a base of the NPN transistor and an anode of the diode is connected to the connection between the cathode of the Zener diode and the resistor.

3. The motor control system of claim 2, wherein the temperature compensated reference voltage varies according to the temperature coefficients of the Zener diode, a base-emitter junction of the NPN transistor, and the diode.

4. The motor control system of claim 1, wherein a pulse width of the PWM motor control signal varies according to the temperature compensated reference voltage and the sensed motor current.

5. The motor control system of claim 1, wherein the microcontroller comprises an analog-to-digital convertor connected to receive a current sense voltage produced by the PWM motor control signal and the motor and to produce a corresponding digital feedback signal to the microcontroller.

6. A motor control method performed by a motor control system, comprising:
    receiving a supply voltage by a temperature compensated power supply;
    generating a temperature compensated reference voltage from the supply voltage by the temperature compensated power supply, wherein the temperature compensated reference voltage varies according to an ambient temperature of the motor control system;
    controlling a motor using a pulse-width-modulated (PWM) motor control signal by a microcontroller, wherein the microcontroller receives the temperature compensated reference voltage from the temperature compensated power supply and a sensed motor current, and varies the pulse width of the motor control signal according to the temperature compensated reference voltage.

7. The motor control method of claim 6, wherein the temperature compensated power supply comprises:
    a resistor and a Zener diode connected between the supply voltage Vs and a ground, wherein a cathode of Zener diode is connected to the resistor;
    an NPN transistor, wherein a collector of the NPN transistor is connected to the supply voltage and an emitter of the NPN transistor is connected to produce the control voltage; and
    a diode, wherein a cathode of the diode is connected to a base of the NPN transistor and an anode of the diode is connected to the connection between the cathode of the Zener diode and the resistor.

8. The motor control method of claim 7, wherein the control voltage varies according to the temperature coefficients of the Zener diode, a base-emitter junction of the NPN transistor, and the diode.

9. The motor control method of claim 7, wherein a voltage of the motor control signal varies according to the temperature compensated reference voltage.

10. The motor control method of claim 7, wherein the microcontroller comprises an analog-to-digital convertor connected to receive a current sense voltage produced by the motor control signal and the motor and to produce a corresponding digital feedback signal to the microcontroller.

* * * * *